United States Patent
Zhang

(10) Patent No.: US 10,324,647 B2
(45) Date of Patent: *Jun. 18, 2019

(54) DYNAMIC COMPRESSION FOR RUNTIME SERVICES

(71) Applicant: INTERNATIONAL BUSINESS MACHINES CORPORATION, Armonk, NY (US)

(72) Inventor: Zhongen Zhang, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/791,459

(22) Filed: Oct. 24, 2017

(65) Prior Publication Data
US 2018/0046393 A1    Feb. 15, 2018

Related U.S. Application Data

(63) Continuation of application No. 15/045,658, filed on Feb. 17, 2016, now Pat. No. 9,851,916.

(51) Int. Cl.
*G06F 3/06* (2006.01)
*H04L 29/08* (2006.01)
*H04L 29/06* (2006.01)

(52) U.S. Cl.
CPC .......... *G06F 3/0638* (2013.01); *G06F 3/0604* (2013.01); *G06F 3/0673* (2013.01);
(Continued)

(58) Field of Classification Search
CPC ..... G06F 3/0638; G06F 3/0604; G06F 3/0673
See application file for complete search history.

(56) References Cited

U.S. PATENT DOCUMENTS 5,812,817 A  9/1998 Hovis et al.
7,380,089 B2  5/2008 Herger et al.
(Continued)

OTHER PUBLICATIONS

IBM: List of IBM Patents or Patent Applications Treated as Related (Appendix P), Oct. 24, 2017, pp. 1-2.
(Continued)

*Primary Examiner* — Edward J Dudek, Jr.
(74) *Attorney, Agent, or Firm* — Erik K. Johnson

(57) ABSTRACT

A method for enabling applications to compress and un-compress selected objects based on defined rules is provided. The method may include generating un-compressed objects and proxy objects, and storing the generated un-compressed objects on an un-compressed objects storage. The method may include receiving defined rules. The method may include compressing the stored un-compressed objects based on the defined rules, and storing the generated compressed objects on a compressed objects storage. The method may include receiving requests to invoke methods. The method may include in response to a determination that the received requests are to invoke methods associated with the un-compressed objects, retrieving the stored un-compressed objects. The method may include in response to a determination that the received requests are to invoke methods associated with the stored compressed objects, retrieving the compressed objects. The method may include restoring the retrieved compressed objects. The method may include presenting the invoked methods.

11 Claims, 10 Drawing Sheets

(52) U.S. Cl.
CPC .............. *H04L 67/06* (2013.01); *H04L 67/34* (2013.01); *H04L 69/04* (2013.01)

(56) References Cited

U.S. PATENT DOCUMENTS

| | | |
|---|---|---|
| 7,474,750 B2 | 1/2009 | Lekatsas et al. |
| 8,767,823 B2 | 7/2014 | Jou et al. |
| 9,851,916 B2 * | 12/2017 | Zhang ..................... H04L 67/06 |
| 2012/0072676 A1 | 3/2012 | Accapadi et al. |
| 2013/0024432 A1 * | 1/2013 | Pendharkar ....... G06F 17/30147 |
| | | 707/693 |
| 2017/0235513 A1 | 8/2017 | Zhang |

OTHER PUBLICATIONS

Mell et al., "The NIST Definition of Cloud Computing," National Institute of Standards and Technology, Sep. 2011, p. 1-3, Special Publication 800-145.

* cited by examiner

DYNAMIC COMPRESSION FOR RUNTIME SERVICES

BACKGROUND

The present invention relates generally to the field of computing, and more specifically, to objects and memory.

Generally, memory stores information for use by a computer. Types of memory may include random-access memory (RAM), disk storage, and virtual memory. Furthermore, computer memory, such as RAM, may operate at high-speeds, as opposed to disk storage that provides slow-to-access program and data storage but in turn has more storage. Typically, memory adds significant cost to software services. As such, a way to reduce cost is to copy data from the RAM and swap the copied RAM data with data on a disk storage. Then, if the copied RAM data is needed again, the copied RAM data may be read back from the disk storage. Furthermore, if storage on the RAM is further reduced, then additional data may be removed from the RAM and stored on the disk storage to make room for incoming data on the RAM.

SUMMARY

A method for enabling at least one application to compress and un-compress a plurality of selected objects based on a plurality of defined customized rules is provided. The method may include generating a plurality of un-compressed objects and a plurality of proxy objects based on the plurality of selected objects, and storing the generated plurality of un-compressed objects on an un-compressed objects storage associated with the at least one application. The method may further include receiving the plurality of defined customized rules to determine when to compress the received and stored plurality of un-compressed objects. The method may also include compressing the stored plurality of un-compressed objects based on the received plurality of defined customized rules to generate a plurality of compressed objects, and storing the generated plurality of compressed objects on a compressed objects storage associated with the at least one application. The method may further include receiving a plurality of requests to invoke a plurality of object methods associated with the stored plurality of un-compressed objects and the stored plurality of compressed objects.

The method may also include determining whether the received plurality of requests are to invoke the plurality of object methods associated with the stored plurality of un-compressed objects and the stored plurality of compressed objects. The method may further include in response to the determination that the received plurality of requests are to invoke the plurality of object methods associated with the plurality of un-compressed objects, retrieving the stored plurality of un-compressed objects from the un-compressed objects storage. The method may also include invoking the plurality of object methods associated with the retrieved plurality of un-compressed objects. The method may further include in response to the determination that the received plurality of requests are to invoke the plurality of object methods associated with the stored plurality of compressed objects, retrieving the plurality of compressed objects from the compressed objects storage. The method may also include restoring the retrieved plurality of compressed objects associated with the received plurality of requests. The method may further include invoking the plurality of object methods associated with the restored plurality of un-compressed objects. The method may also include presenting the invoked methods associated with the retrieved plurality of un-compressed objects and the restored plurality of un-compressed objects.

A computer system for enabling at least one application to compress and un-compress a plurality of selected objects based on a plurality of defined customized rules is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include generating a plurality of un-compressed objects and a plurality of proxy objects based on the plurality of selected objects, and storing the generated plurality of un-compressed objects on an un-compressed objects storage associated with the at least one application. The method may further include receiving the plurality of defined customized rules to determine when to compress the received and stored plurality of un-compressed objects. The method may also include compressing the stored plurality of un-compressed objects based on the received plurality of defined customized rules to generate a plurality of compressed objects, and storing the generated plurality of compressed objects on a compressed objects storage associated with the at least one application. The method may further include receiving a plurality of requests to invoke a plurality of object methods associated with the stored plurality of un-compressed objects and the stored plurality of compressed objects.

The method may also include determining whether the received plurality of requests are to invoke the plurality of object methods associated with the stored plurality of un-compressed objects and the stored plurality of compressed objects. The method may further include in response to the determination that the received plurality of requests are to invoke the plurality of object methods associated with the plurality of un-compressed objects, retrieving the stored plurality of un-compressed objects from the un-compressed objects storage. The method may also include invoking the plurality of object methods associated with the retrieved plurality of un-compressed objects. The method may further include in response to the determination that the received plurality of requests are to invoke the plurality of object methods associated with the stored plurality of compressed objects, retrieving the plurality of compressed objects from the compressed objects storage. The method may also include restoring the retrieved plurality of compressed objects associated with the received plurality of requests. The method may further include invoking the plurality of object methods associated with the restored plurality of un-compressed objects. The method may also include presenting the invoked methods associated with the retrieved plurality of un-compressed objects and the restored plurality of un-compressed objects.

A computer program product for enabling at least one application to compress and un-compress a plurality of selected objects based on a plurality of defined customized rules is provided. The computer program product may include one or more computer-readable storage devices and program instructions stored on at least one of the one or more tangible storage devices, the program instructions executable by a processor. The computer program product may include program instructions to generate a plurality of un-compressed objects and a plurality of proxy objects based on the plurality of selected objects, and store the generated plurality of un-compressed objects on an un-compressed objects storage associated with the at least one application. The computer program product may further include program instructions to receive the plurality of defined customized rules to determine when to compress the received and stored plurality of un-compressed objects. The computer program product may also include program instructions to compress the stored plurality of un-compressed objects based on the received plurality of defined customized rules to generate a plurality of compressed objects, and store the generated plurality of compressed objects on a compressed objects storage associated with the at least one application. The computer program product may further include program instructions to receive a plurality of requests to invoke a plurality of object methods associated with the stored plurality of un-compressed objects and the stored plurality of compressed objects.

The computer program product may also include program instructions to determine whether the received plurality of requests are to invoke the plurality of object methods associated with the stored plurality of un-compressed objects and the stored plurality of compressed objects. The computer program product may further include program instructions to, in response to the determination that the received plurality of requests are to invoke the plurality of object methods associated with the plurality of un-compressed objects, retrieve the stored plurality of un-compressed objects from the un-compressed objects storage. The computer program product may also include program instructions to invoke the plurality of object methods associated with the retrieved plurality of un-compressed objects. The computer program product may further include program instructions to, in response to the determination that the received plurality of requests are to invoke the plurality of object methods associated with the stored plurality of compressed objects, retrieve the plurality of compressed objects from the compressed objects storage. The computer program product may also include program instructions to restore the retrieved plurality of compressed objects associated with the received plurality of requests. The computer program product may further include program instructions to invoke the plurality of object methods associated with the restored plurality of un-compressed objects. The computer program product may also include program instructions to present the invoked methods associated with the retrieved plurality of un-compressed objects and the restored plurality of un-compressed objects.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
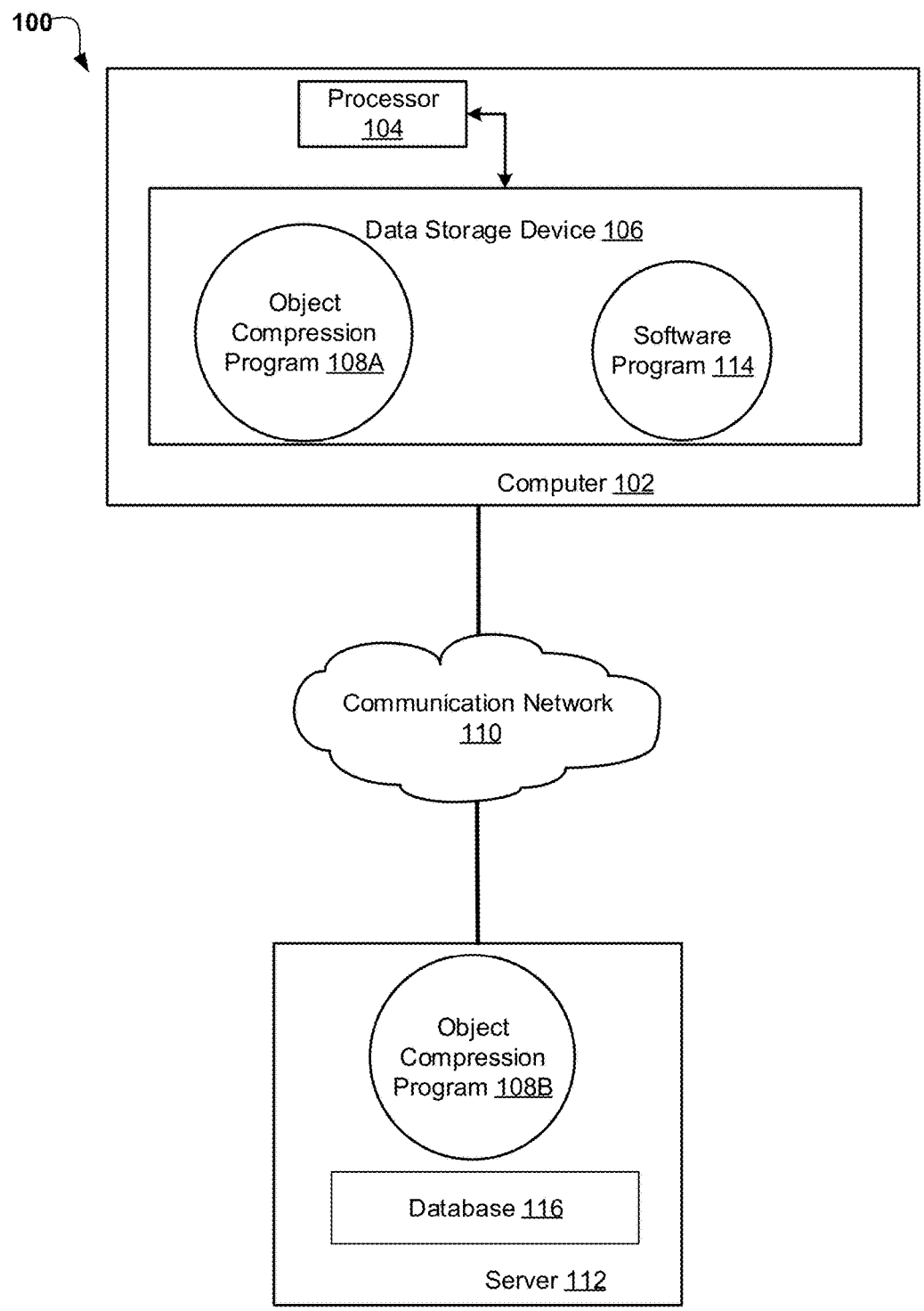
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to memory. The following described exemplary embodiments provide a system, method and program product for enabling applications to compress and un-compress selected objects based on customized rules. Therefore, the present embodiment has the capacity to improve the technical field associated with memory by selecting objects associated with applications and enabling applications to compress and un-compress the selected objects. Specifically, the present embodiment may compress and un-compress data at the application level, as opposed to the operating system level, based on customized compression rules, and enable applications to adjust the customized compression rules to provide optimized output.

As previously described with respect to memory, computer memory, such as RAM, may operate at high-speeds as opposed to storage that provides slow-to-access program and data storage but in turn has more storage. Therefore, a way to reduce the cost of adding memory may be to compress and un-compress data at the operating system level. For example, data may be copied from the RAM and the copied RAM data may be swapped with data on a disk storage. Then, if the copied RAM data is needed again, the copied RAM data may be read back from the disk storage. Furthermore, if storage on the RAM is further reduced, then additional data may be removed from the RAM and stored on the disk storage to make room for incoming data on the RAM. However, with such an operating system dependent method, operating systems may spend most time transferring data between the RAM and the disk storage. Additionally, because disk storage operates much slower than the RAM, it may take more time to read data from the disk storage than from the RAM. Furthermore, operation systems may not control when and which piece of operating system memory should be compressed. As such, it may be advantageous, among other things, to provide a system, method and program product for enabling applications to compress and un-compress selected objects based on defined and customized rules. Specifically, the system, method and program product may compress and un-compress data at the application level, as opposed to the operating system level, using a memory compression management plugin based on defined and customized compression rules.

According to at least one implementation of the present embodiment, objects associated with object-oriented applications may be generated. Next, object rules may be received to determine to compress and un-compress the generated objects. Then, requests to invoke the generated objects may be received. Next, based on the received object rules, the generated objects may be compressed. Then, whether the received requests to invoke the generated objects are requests to invoke compressed or un-compressed objects may be determined. Next, in response to the determination that the received requests are to invoke un-compressed objects, the un-compressed objects may be invoked. Then, in response to the determination that the received requests are to invoke compressed objects, the compressed objects may be invoked. Next, object results may be returned based on the received requests to invoke the generated objects.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for enabling applications to compress and un-compress selected objects based on defined and customized rules.

According to at least one implementation, objects associated with object-oriented applications may be generated. Next, object rules may be received to determine when to compress and un-compress the generated objects. Then, requests to invoke the generated objects may be received. Next, based on the received object rules, the generated objects may be compressed. Then, whether the received requests to invoke the generated objects are requests to invoke compressed or un-compressed objects may be determined. Next, in response to the determination that the received requests are to invoke un-compressed objects, the un-compressed objects may be invoked. Then, in response to the determination that the received requests are to invoke compressed objects, the compressed objects may be invoked. Next, object results may be presented to users based on the received requests.

Referring now to FIG. 1, an exemplary networked computer environment 100 in accordance with one embodiment is depicted. The networked computer environment 100 may include a computer 102 with a processor 104 and a data storage device 106 that is enabled to run an object compression program 108A and a software program 114. The software program 114 may be an application program such as an internet browser and an email program. The object compression program 108A may communicate with the software program 114. The networked computer environment 100 may also include a server 112 that is enabled to run an object compression program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 8, server computer 112 may include internal components 810a and external components 910a, respectively, and client computer 102 may include internal components 810b and external components 910b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the object compression program 108A, 108B may interact with a database 116 that may be embedded in various storage devices, such as, but not limited to a mobile device 102, a networked server 112, or a cloud storage service.

According to the present embodiment, a program, such as an object compression program 108A and 108B may run on the client computer 102 or on the server computer 112 via a communications network 110. The object compression program 108A, 108B may enable applications to compress and un-compress selected objects based on customized rules. Specifically, a user using a computer, such as computer 102, may run an object compression program 108A, 108B, that interacts with a software program 114, to enable object-oriented applications to compress and un-compress objects based on defined and customized rules, and to invoke the objects based on whether the objects are compressed or un-compressed.

Figure 2:
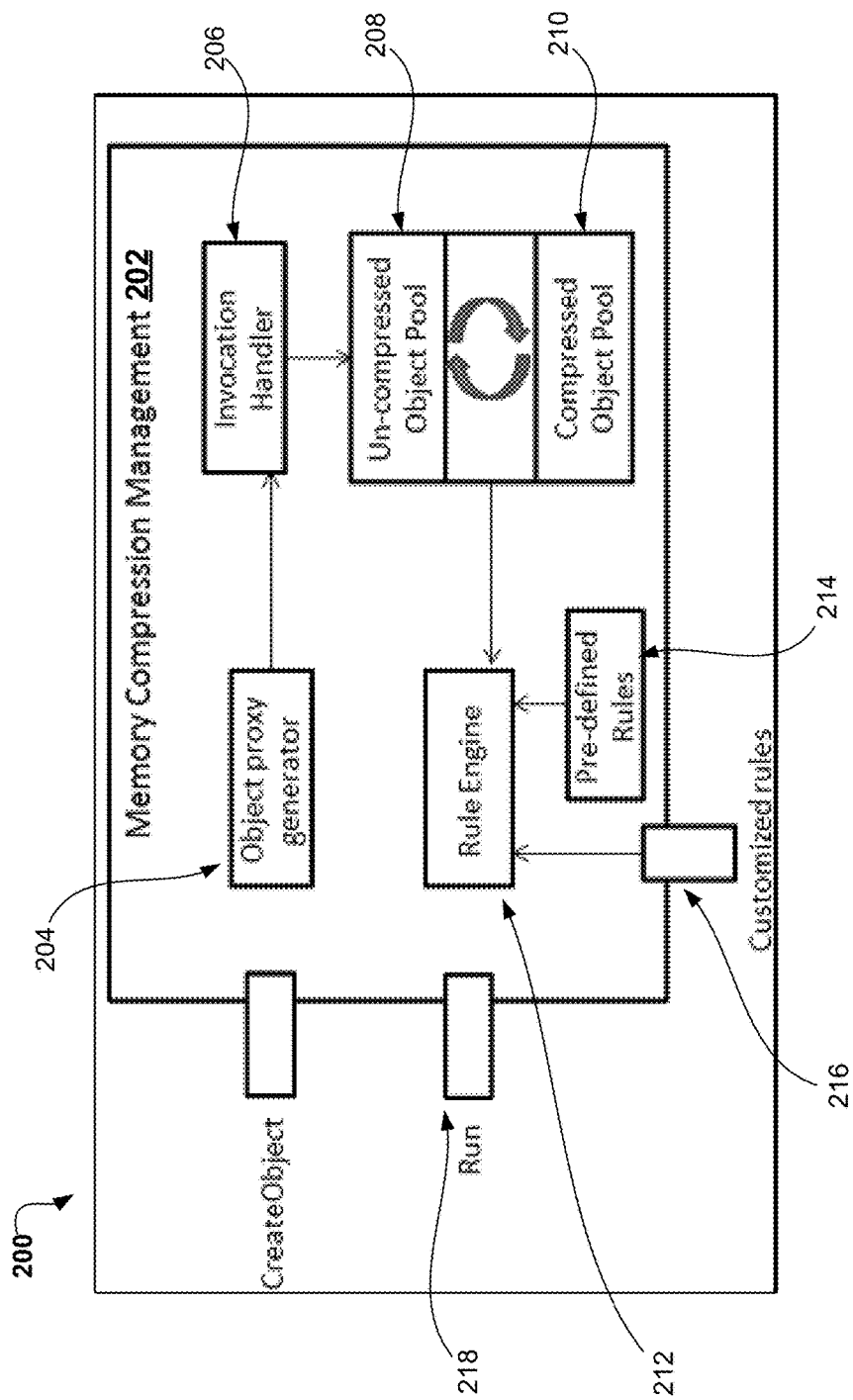
FIG. 2 is a block diagram illustrative of a system architecture of an object compression program according to one embodiment.

Referring now to FIG. 2, a block diagram 200 illustrative of a system architecture of an object compression program 108A, 108B (FIG. 1) is depicted. As previously described in FIG. 1, the object compression program 108A, 108B (FIG. 1) may enable object-oriented applications to compress and un-compress objects based on defined and customized rules. Specifically, object-oriented applications may include objects, and object interfaces associated with the objects. As such, the object compression program 108A, 108B (FIG. 1) may include a memory compression management 202 to manage the objects and to determine when and which objects to compress and un-compress based on customized rules. Specifically, the memory compression management 202 may include an object proxy generator 204 to receive requests from object-oriented applications to generate un-compressed real objects based on selected objects associated with the object-oriented applications. Then, based on the received requests, the object proxy generator 204 may extract the object interfaces associated with the selected objects. Next, the object proxy generator 204 may generate proxy objects associated with the selected objects, whereby the proxy objects may include dynamically generated classes to implement the interfaces of the selected objects.

Thereafter, the object proxy generator 204 may generate the un-compressed real objects associated with the selected objects and the proxy objects, and may store the un-compressed real objects on an un-compressed object pool 208.

Furthermore, the memory compression management 202 may include a rule engine 212 to determine when and which un-compressed real objects to compress based on defined rules 214 and/or customized rules 216. For example, via the rule engine 212, the object compression program 108A, 108B (FIG. 1) may define rules such as: un-compressed objects are compressed 10 minutes after the last time the un-compressed object is invoked. Additionally, the memory compression management 202 may include a run 218 to execute the rule engine 212, compress the un-compressed real objects, and store the un-compressed real object on a compressed object pool 210. Also, the memory compression management 202 may include an invocation handler 206, whereby the invocation handler 206 may receive requests to invoke methods associated with the stored un-compressed real objects and the stored compressed real objects. Specifically, the invocation handler 206 may receive requests via the generated proxy objects to invoke a method associated with the stored un-compressed real objects and the stored compressed real objects. Then, the invocation handler 206 may determine whether the received requests are requests to invoke methods associated with the un-compressed real objects or the compressed real objects. Next, the invocation handler 206 may retrieve the un-compressed real objects from the un-compressed object pool 208 or the compressed real objects from the compressed pool 210 based on the received requests, and implement the object interfaces associated with the un-compressed real objects and the compressed real objects.

Figure 3:
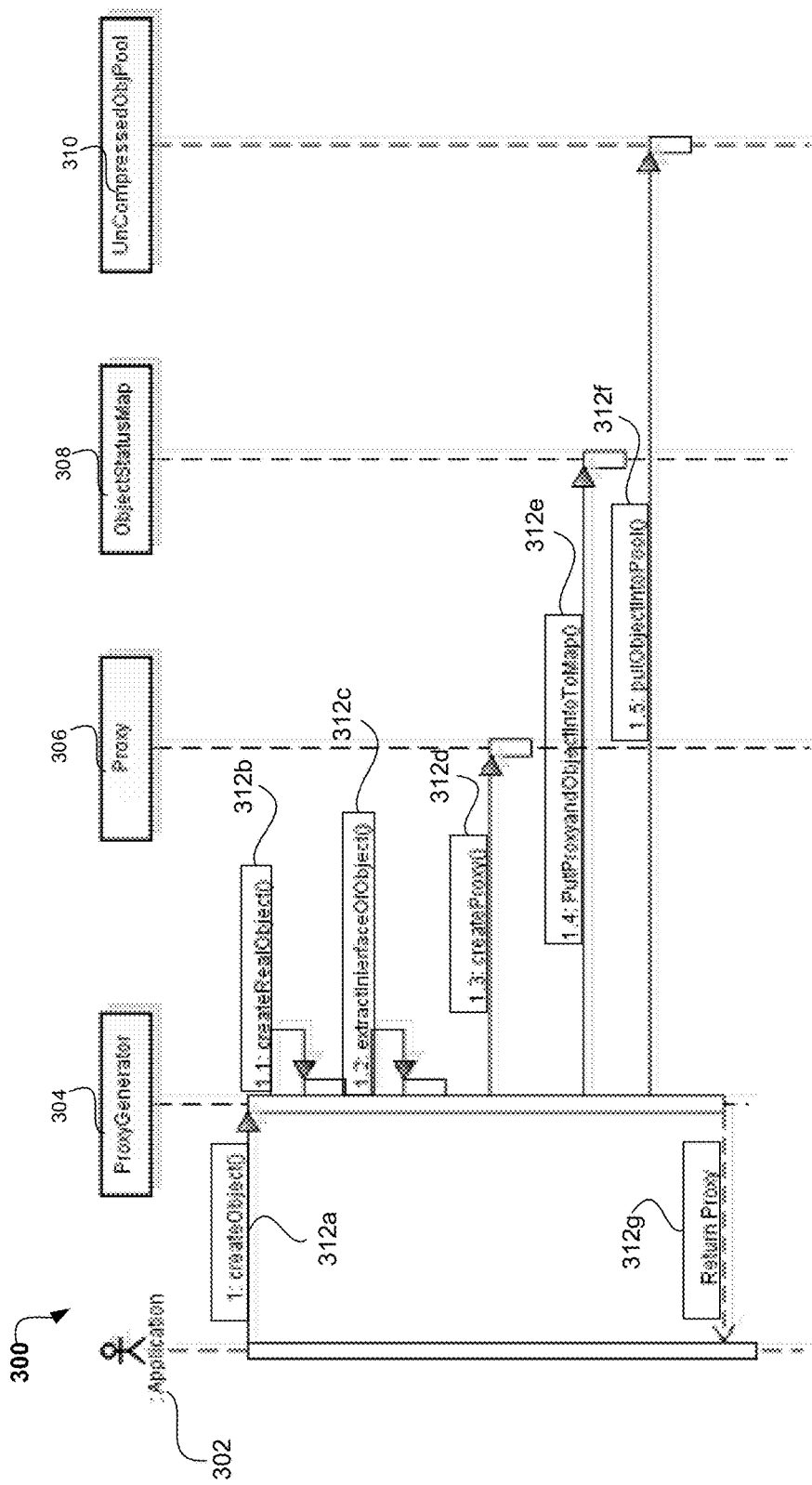
FIG. 3 is an example of a data flow diagram for an object compression program to generate un-compressed real objects according to one embodiment.

Referring now to FIG. 3, an example of a data flow diagram 300 for an object compression program 108A, 108B (FIG. 1) to generate un-compressed real objects according to one embodiment is depicted. As previously described in FIG. 2, the object compression program 108A, 108B (FIG. 1) may include the memory compression management 202 (FIG. 2) to manage objects associated with object-oriented applications 302. Furthermore, the memory compression management 202 (FIG. 2) may include an object proxy generator 304 to receive requests to generate un-compressed real objects. Specifically, at 312a, the object proxy generator 304 may receive requests from object-oriented applications 302 to generate un-compressed real objects based on selected objects associated with the object-oriented applications 302. As such, at 312b, the object proxy generator 304 may generate the un-compressed real objects associated with the selected objects. Then, at 312c, the object proxy generator 304 may extract the object interfaces of the selected objects. Next, at 312d, the object proxy generator 304 may generate proxy objects 306. Then, at 312e, the object proxy generator 304 may store the proxy objects and the un-compressed real object information and compression status on an object info map 308. Furthermore, at 312f, the object proxy generator 304 may store the un-compressed real objects on the un-compressed object pool 310 and return the results at 312g.

Figure 4:
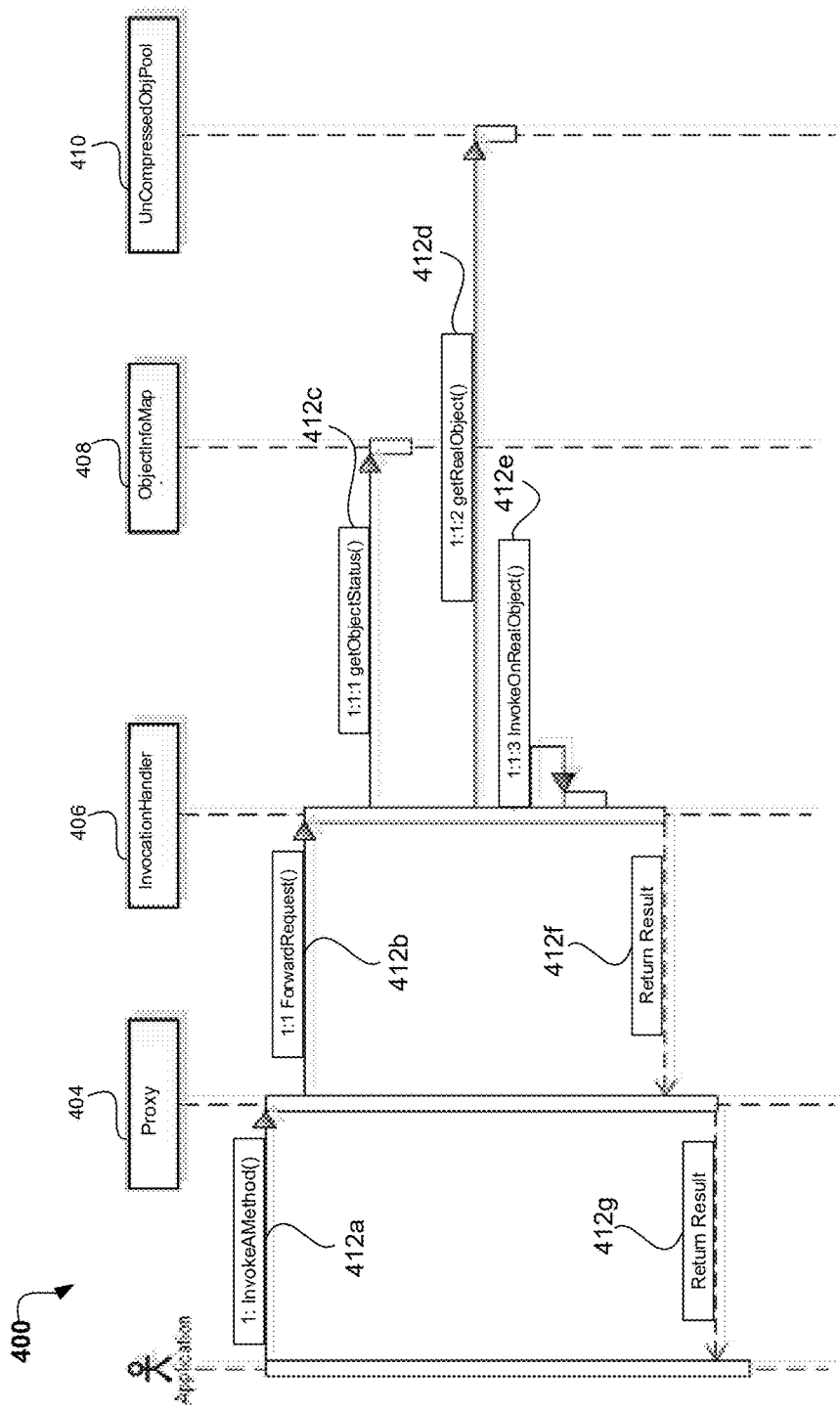
FIG. 4 is an example of a data flow diagram for an object compression program to invoke methods associated with un-compressed real objects according to one embodiment.

Referring now to FIG. 4, an example of a data flow diagram 400 for an object compression program 108A, 108B (FIG. 1) to invoke methods associated with un-compressed real objects according to one embodiment is depicted. As previously described in FIG. 3, the object compression program 108A, 108B (FIG. 1) may generate un-compressed real objects and store the un-compressed real objects on the un-compressed object pool 310 (FIG. 3). As such, the object compression program 108A, 108B (FIG. 1) may enable users to invoke methods associated with the un-compressed objects stored on the un-compressed object pool 310 (FIG. 3). Specifically, at 412a, the object compression program 108A, 108B (FIG. 1) may receive requests via the proxy objects 404 to invoke methods associated with the un-compressed objects. Then, at 412b, the object compression program 108A, 108B (FIG. 1) may forward the received requests to the invocation handler 406. Next, at 412c, the object compression program 108A, 108B (FIG. 1) may check the status of the un-compressed real object, via the object info map 408, that is associated with the method to invoke the un-compressed real object to determine whether the un-compressed real object is un-compressed. Then, at 412d, the object compression program 108A, 108B (FIG. 1) may retrieve the un-compressed real object from the un-compressed object pool 410. Next, at 412e, the object compression program 108A, 108B (FIG. 1) may invoke the requested method on the un-compressed real object and return the results at 412f and 412g.

Figure 5:
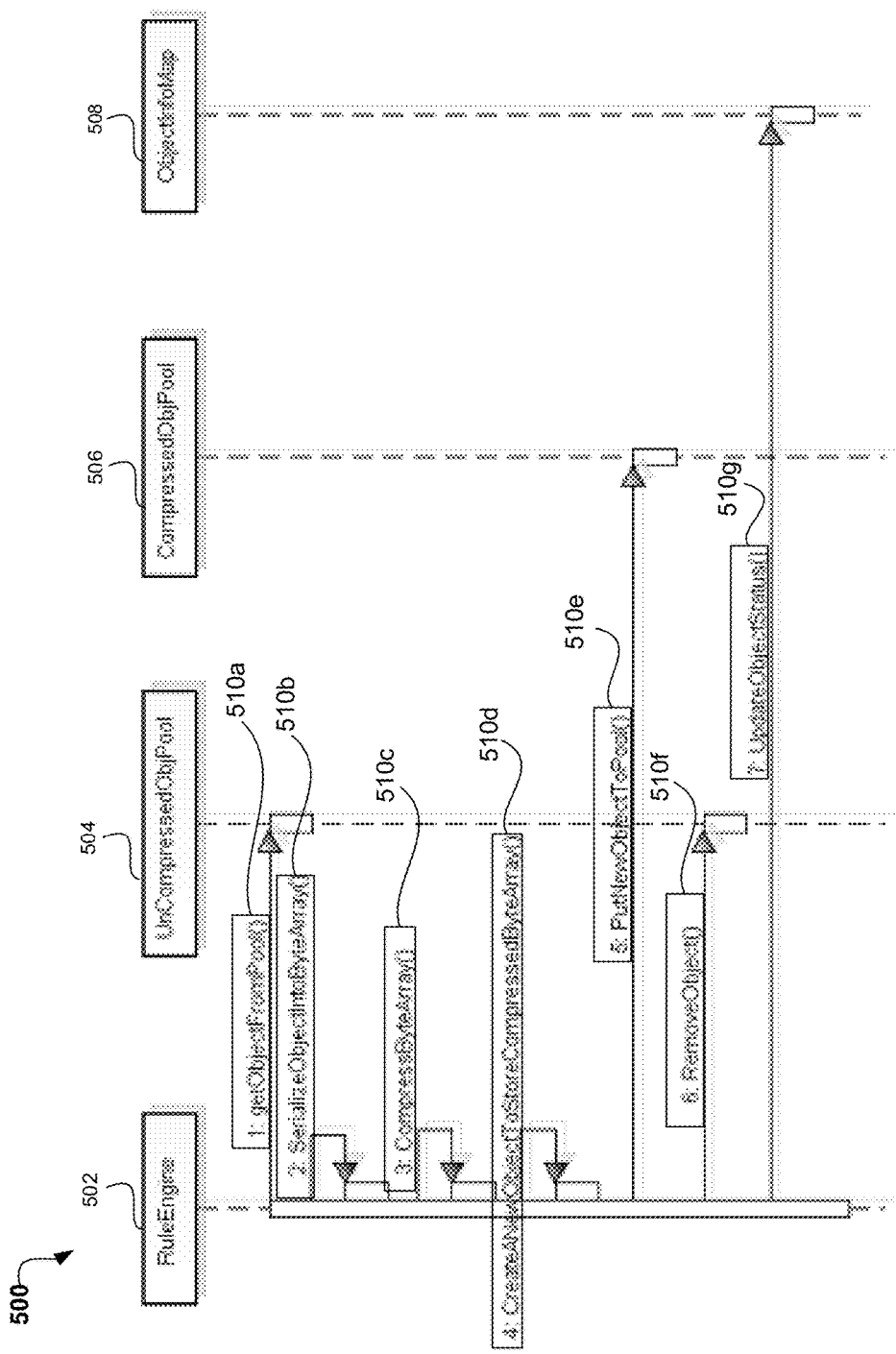
FIG. 5 is an example of a data flow diagram for an object compression program to compress the un-compressed real objects according to one embodiment.

Referring now to FIG. 5, an example of a data flow diagram 500 for an object compression program 108A, 108B (FIG. 1) to compress the un-compressed real objects according to one embodiment is depicted. As previously described in FIG. 2, the object compression program 108A, 108B (FIG. 1) may include a rule engine 212 (FIG. 2) to determine when and which un-compressed real objects are compressed based on defined rules 214 (FIG. 2) and/or customized rules 216 (FIG. 2). Specifically, at 510a, based on defined rules 214 (FIG. 2) and/or customized rules 216 (FIG. 2), the rule engine 502 may determine to compress un-compressed real objects, and therefore, retrieve the un-compressed real objects from the un-compressed object pool 504. Then, at 510b, the object compression program 108A, 108B (FIG. 1) may serialize the un-compressed real objects into byte arrays. Next, at 510c, the object compression program 108A, 108B (FIG. 1) may compress the byte array associated with the serialized un-compressed object. Thereafter, at 510d, the object compression program 108A, 108B (FIG. 1) may generate a compressed real object based on the compressed byte array. Then, at 510e, the object compression program 108A, 108B (FIG. 1) may store the compressed real object on the compressed object pool 506. Next, at 510f, the object compression program 108A, 108B (FIG. 1) may remove the un-compressed real object associated with the compressed real object from the un-compressed object pool 504. Next, at 510g, the object compression program 108A, 108B (FIG. 1) may update the status of the compressed real object from un-compressed to compressed on the object info map 508.

Figure 6:
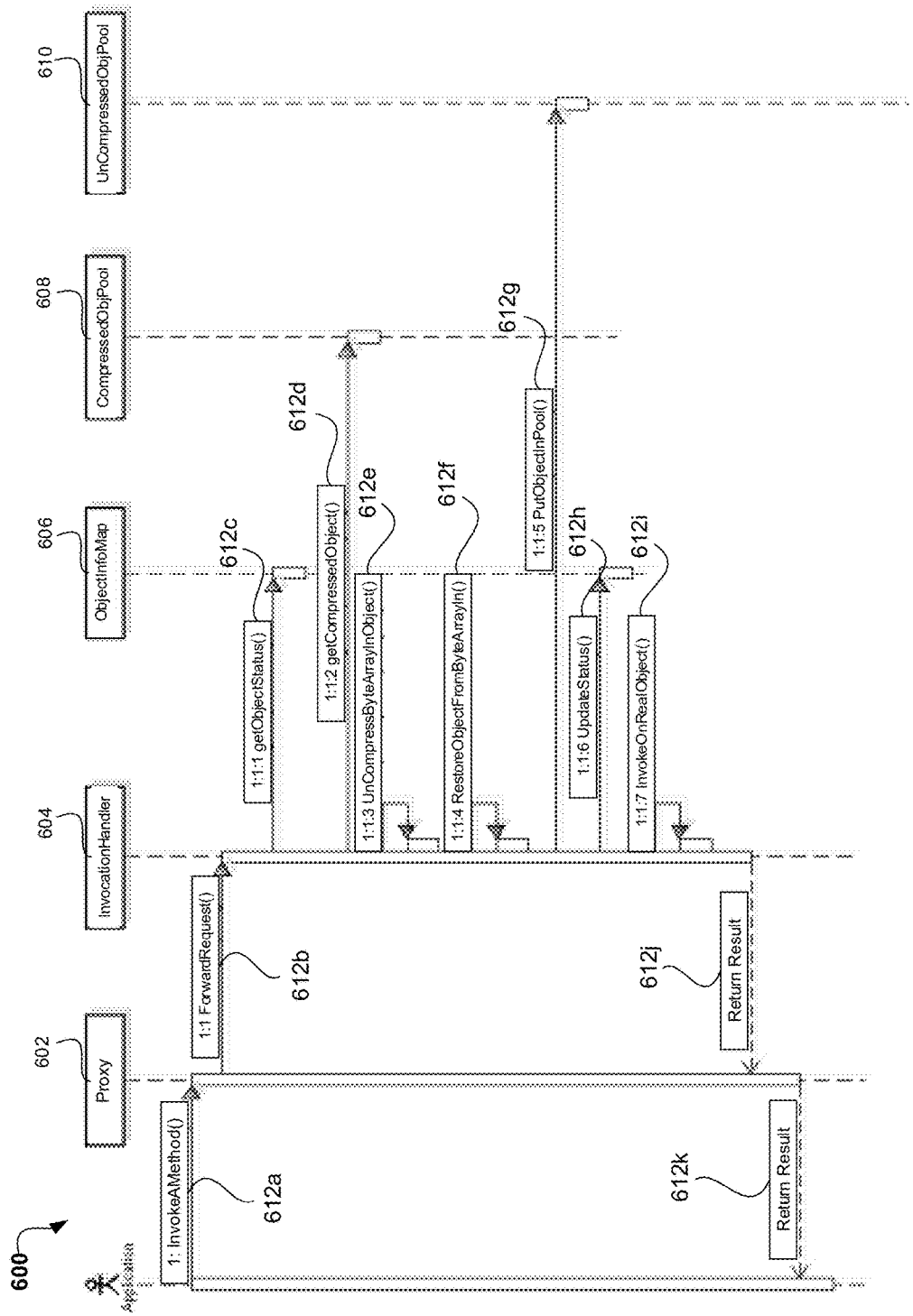
FIG. 6 is an example of a data flow diagram for an object compression program to invoke methods associated with the compressed real objects.

Referring now to FIG. 6, an example of a data flow diagram 600 for an object compression program 108A, 108B (FIG. 1) to invoke methods associated with the compressed real objects according to one embodiment is depicted. As previously described in FIG. 5, the object compression program 108A, 108B (FIG. 1) may compress the un-compressed real objects based on defined rules 214 (FIG. 2) and/or customized rules 216 (FIG. 2). Furthermore, the object compression program 108A, 108B (FIG. 1) may enable users to invoke methods associated with the compressed real objects. Specifically, at 612a, the object compression program 108A, 108B (FIG. 1) may receive requests via the proxy objects 602 to invoke methods associated with the compressed real objects. Then, at 612b, the object compression program 108A, 108B (FIG. 1) may forward the received requests to the invocation handler 604. Next, at 612c, the object compression program 108A, 108B (FIG. 1)

may check the status of the compressed real objects associated with the received requests on the object info map 606 to determine whether the real objects are compressed.

Thereafter, at 612d, based on the real objects status being compressed, the object compression program 108A, 108B (FIG. 1) may retrieve the compressed real objects from the compressed object pool 608. Then, at 612e, the object compression program 108A, 108B (FIG. 1) may un-compress the byte array associated with the retrieved compressed real object. Next, at 612f, the object compression program 108A, 108B (FIG. 1) may restore the compressed real object to an un-compressed real object based on the un-compressed byte array. Then, at 612g, the object compression program 108A, 108B (FIG. 1) may store the un-compressed real object based on the compressed real object on the un-compressed object pool 610. Next, at 612h, the object compression program 108A, 108B (FIG. 1) may update the status of the stored un-compressed real object on the object info map 606. Then, at 612i, the object compression program 108A, 108B (FIG. 1) may invoke the requested method associated with the un-compressed real object and return the results at 612j and 612k.

Figure 7:
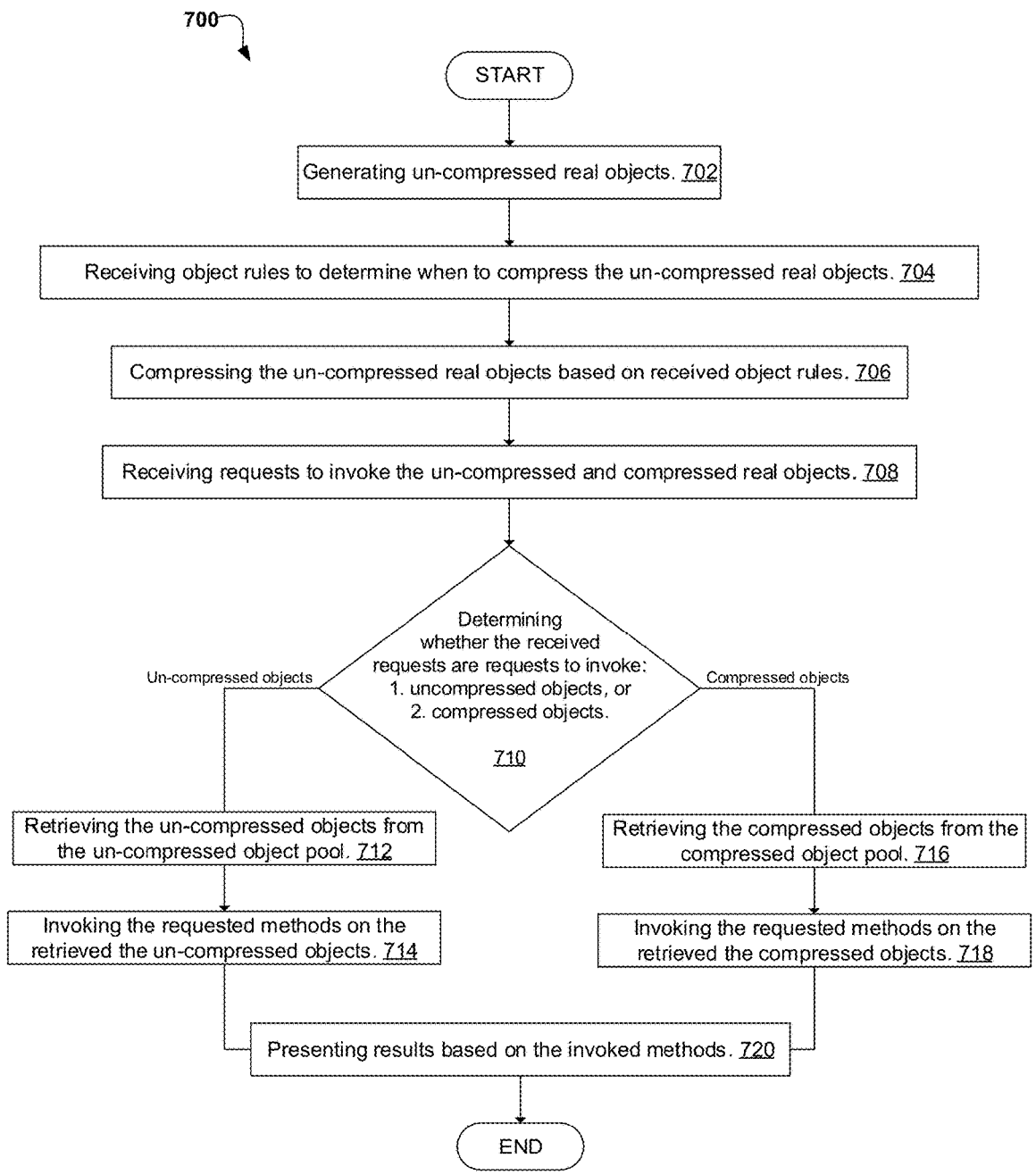
FIG. 7 is an operational flowchart illustrating the steps carried out by a program for enabling applications to compress and un-compress selected objects based on defined and customized rules according to one embodiment.

Referring now to FIG. 7, an operational flowchart 700 illustrating the steps carried out by a program for enabling applications to compress and un-compress selected objects based on defined and customized rules according to one embodiment is depicted. At 702, the object compression program 108A, 108B (FIG. 1) may generate un-compressed real objects. As previously described in FIGS. 2 and 3, the object compression program 108A, 108B (FIG. 1) may include the memory compression management 202 (FIG. 2) to manage objects associated with object-oriented applications 302 (FIG. 3). Furthermore, the memory compression management 202 (FIG. 2) may include an object proxy generator 304 (FIG. 3) to receive requests to generate un-compressed real objects. Specifically, the object compression program 108A, 108B (FIG. 1) may receive requests via the object proxy generator 304 (FIG. 3) from object-oriented applications 302 (FIG. 3) to generate un-compressed real objects based on the selected objects associated with the object-oriented applications 302 (FIG. 3). As such, the object compression program 108A, 108B (FIG. 1) may generate the un-compressed real objects associated with the selected objects. Then, the object compression program 108A, 108B (FIG. 1) may extract the object interface of the selected objects. Next, the object compression program 108A, 108B (FIG. 1) may generate proxy objects 306 (FIG. 3). Then, the object compression program 108A, 108B (FIG. 1) may store the proxy objects and the un-compressed real object information, that may include the compression status of the un-compressed real object, on an object info map 308 (FIG. 3). Furthermore, the object compression program 108A, 108B (FIG. 1) may store the un-compressed real objects on the un-compressed object pool 310 (FIG. 3).

Next, at 704, the object compression program 108A, 108B (FIG. 1) may receive object rules to determine when to compress the generated un-compressed real objects. Specifically, the object compression program 108A, 108B (FIG. 1) may include a rule engine 212 (FIG. 2) whereby users may be enabled to define and customize rules 214, 216 (FIG. 2) to determine when and which objects to compress based on the defined rules 214 (FIG. 2) and/or the customized rules 216 (FIG. 2). For example, via the rule engine 212 (FIG. 2), the object compression program 108A, 108B (FIG. 1) may define rules such as: un-compressed objects are compressed 10 minutes after the last time the un-compressed object is invoked; un-compressed objects are compressed when the un-compressed objects "isRunning" status is false; and the un-compressed objects associated with a session are compressed 15 mins after the un-compressed objects are generated.

Then, at 706, the object compression program 108A, 108B (FIG. 1) may compress the un-compressed real objects based on the received object rules. As previously described at step 704, the object compression program 108A, 108B (FIG. 1) may include a rule engine 212 (FIG. 2) to determine when and which of the un-compressed objects to compress based on the defined rules 214 (FIG. 2) and/or the customized rules 216 (FIG. 2). For example, the object compression program 108A, 108B (FIG. 1) may compress the un-compressed real objects associated with applications based on the rule that un-compressed objects are compressed 10 minutes after the last time the un-compressed real objects are invoked. Specifically, and as previously described in FIG. 5, the object compression program 108A, 108B (FIG. 1) may serialize the un-compressed real objects into byte arrays. Next, the object compression program 108A, 108B (FIG. 1) may compress the byte array associated with the serialized un-compressed object. Thereafter, the object compression program 108A, 108B (FIG. 1) may generate a compressed real object based on the compressed byte array. Then, the object compression program 108A, 108B (FIG. 1) may store the compressed real object on the compressed object pool 506 (FIG. 5). Next, the object compression program 108A, 108B (FIG. 1) may remove the un-compressed real object associated with the compressed real object from the un-compressed object pool 504 (FIG. 5). Next, the object compression program 108A, 108B (FIG. 1) may update the status of the compressed real object from un-compressed to compressed on the object info map 508 (FIG. 5).

Next, at 708, the object compression program 108A, 108B (FIG. 1) may receive requests to invoke the un-compressed real objects and the compressed real objects. Specifically, the object compression program 108A, 108B (FIG. 1) may receive requests to invoke methods associated with the un-compressed real objects and the compressed real objects, whereby the methods may include functions associated with the un-compressed real objects and the compressed real objects. For example, the object compression program 108A, 108B (FIG. 1) may receive requests to invoke methods based on the un-compressed real objects and the compressed real objects that are associated with applications such as email applications and web browser applications.

Next, at 710, the object compression program 108A, 108B (FIG. 1) may determine whether the received requests are to invoke the un-compressed real objects and the compressed real objects. As previously described at step 702, the object compression program 108A, 108B (FIG. 1) may generate the un-compressed real objects and then store the un-compressed real objects on the un-compressed object pool 208 (FIG. 2), and may compress the un-compressed objects and the store the compressed object on the compressed object pool 210 (FIG. 2) depending on the status of the compressible real objects. Furthermore, and as previously described at step 708, the object compression program 108A, 108B (FIG. 1) may receive requests to invoke the un-compressed real objects and the compressed real objects. Therefore, based on the received requests, the object compression program 108A, 108B (FIG. 1) may determine whether to retrieve the un-compressed real objects and the compressed real objects.

Thereafter, at 712, in response to the determination that the received requests are requests to invoke the un-compressed real objects, the object compression program 108A, 108B (FIG. 1) may retrieve the un-compressed real objects from the un-compressed object pool 208 (FIG. 2). Specifically, and as previously described in FIG. 4, the object compression program 108A, 108B (FIG. 1) may receive requests via the proxy objects 404 (FIG. 4) to invoke methods associated with the un-compressed real objects. Then, the object compression program 108A, 108B (FIG. 1) may forward the received requests to the invocation handler 406 (FIG. 4). Next, the object compression program 108A, 108B (FIG. 1) may check the statuses of the un-compressed real objects, via the object info map 408 (FIG. 4), that are associated with the methods to invoke the un-compressed real objects to determine whether the un-compressed real objects are un-compressed. Then, the object compression program 108A, 108B (FIG. 1) may retrieve the un-compressed real objects from the un-compressed object pool 410 (FIG. 4).

Next, at 714, the object compression program 108A, 108B (FIG. 1) may invoke the requested methods on the retrieved un-compressed real objects. As previously described at step 712, based on the determination that the received requests are requests to invoke un-compressed real objects, the object compression program 108A, 108B (FIG. 1) may retrieve the un-compressed real objects from the un-compressed object pool 208 (FIG. 2). Therefore, the object compression program 108A, 108B (FIG. 1) may invoke the requested methods on the retrieved un-compressed real objects. For example, the object compression program 108A, 108B (FIG. 1) may receive requests to invoke methods associated with an un-compressed real object such as a calendar object on an email applications. Then, the object compression program 108A, 108B (FIG. 1) may determine that the calendar object is an un-compressed real object stored on the un-compressed object pool 208 (FIG. 2). As such, the object compression program 108A, 108B (FIG. 1) may retrieve the calendar object from the un-compressed object pool 208 (FIG. 2) and invoke the methods associated with the calendar object based on the received requests.

Alternatively, at 716, in response to the determination that the received requests are requests to invoke the compressed real objects, the object compression program 108A, 108B (FIG. 1) may retrieve the compressed real objects from the compressed object pool 210 (FIG. 2). Specifically, and as previously described in FIG. 6, the object compression program 108A, 108B (FIG. 1) may receive requests via the proxy objects 602 (FIG. 6) to invoke methods associated with the compressed real objects. Then, the object compression program 108A, 108B (FIG. 1) may forward the received requests to the invocation handler 604 (FIG. 6). Next, the object compression program 108A, 108B (FIG. 1) may check the statuses of the compressed real objects associated with the received requests on the object info map 606 (FIG. 6) to determine whether the compressed real objects are compressed. Thereafter, based on the statuses of the compressed real objects being compressed, the object compression program 108A, 108B (FIG. 1) may retrieve the compressed real objects from the compressed object pool 608 (FIG. 6). Then, the object compression program 108A, 108B (FIG. 1) may un-compress the byte array associated with the retrieved real object. Next, the object compression program 108A, 108B (FIG. 1) may restore the compressed real object to an un-compressed real object based on the un-compressed byte array. Then, the object compression program 108A, 108B (FIG. 1) may store the un-compressed real object based on the compressed real object on the un-compressed object pool 610 (FIG. 6). Next, the object compression program 108A, 108B (FIG. 1) may update the status of the stored un-compressed real object on the object info map 606 (FIG. 6).

Then, at 718, the object compression program 108A, 108B (FIG. 1) may invoke the requested methods on the retrieved compressed real objects. As previously described at step 716, based on the determination that the received requests are requests to invoke compressed real objects, the object compression program 108A, 108B (FIG. 1) may retrieve the compressed real objects from the compressed object pool 210 (FIG. 2). Therefore, the object compression program 108A, 108B (FIG. 1) may invoke the requested methods on the retrieved compressed real objects. For example, the object compression program 108A, 108B (FIG. 1) may receive requests to invoke methods associated with an object on a web browser applications. Then, the object compression program 108A, 108B (FIG. 1) may determine that the object is a compressed real object stored on the compressed object pool 210 (FIG. 2). As such, the object compression program 108A, 108B (FIG. 1) may retrieve the object from the compressed object pool 210 (FIG. 2), un-compress the object, and invoke the methods associated with the object based on the received request.

Next, at 720, the object compression program 108A, 108B (FIG. 1) may present the invoked methods associated with the received requests. As previously described at steps 714 and 718, the object compression program 108A, 108B (FIG. 1) may retrieve the un-compressed real objects and the compressed real objects based on received requests. Furthermore, the object compression program 108A, 108B (FIG. 1) may invoke the methods associated with the retrieved un-compressed and compressed objects based on the received requests, and present the methods invocation to users. For example, the object compression program 108A, 108B (FIG. 1) may receive requests to invoke methods associated with an object such as a search bar on a web browser application. Thereafter, the object compression program 108A, 108B (FIG. 1) may retrieve the real object from the un-compressed object pool 208 (FIG. 2) or the compressed object pool 210 (FIG. 2), depending on whether the object is un-compressed or compressed. Then, the object compression program 108A, 108B (FIG. 1) may invoke the methods on the search bar such as receiving text on the search bar and predicting search terms associated with the received texts.

It may be appreciated that FIGS. 1-7 provide only illustrations of one implementation and do not imply any limitations with regard to how different embodiments may be implemented. Many modifications to the depicted environments may be made based on design and implementation requirements.

Figure 8:
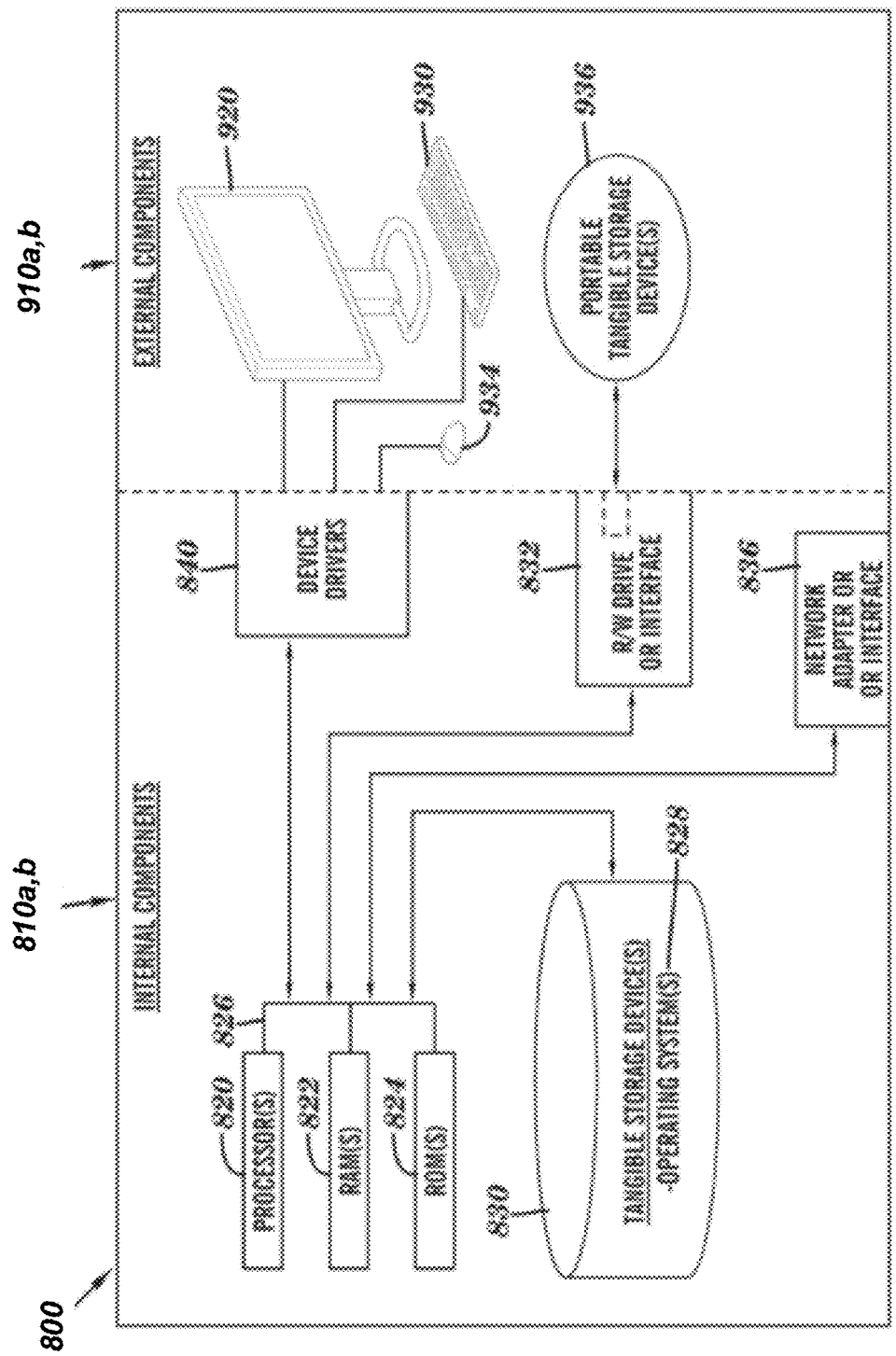
FIG. 8 is a block diagram of the system architecture of a program for enabling applications to compress and un-compress selected objects based on defined customized rules according to one embodiment.

FIG. 8 is a block diagram 800 of internal and external components of computers depicted in FIG. 1 in accordance with an illustrative embodiment of the present invention. It should be appreciated that FIG. 8 provides only an illustration of one implementation and does not imply any limitations with regard to the environments in which different embodiments may be implemented. Many modifications to the depicted environments may be made based on design and implementation requirements.

Data processing system 810, 910 is representative of any electronic device capable of executing machine-readable program instructions. Data processing system 810, 910 may be representative of a smart phone, a computer system, PDA, or other electronic devices. Examples of computing systems, environments, and/or configurations that may represented by data processing system 810, 910 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 810 a, b and external components 910 a, b illustrated in FIG. 8. Each of the sets of internal components 810 a, b includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the object compression program 108A (FIG. 1) in client computer 102 (FIG. 1), and the object compression program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 810 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as an object compression program 108A and 108B (FIG. 1), can be stored on one or more of the respective portable computer-readable tangible storage devices 936, read via the respective R/W drive or interface 832 and loaded into the respective hard drive 830.

Each set of internal components 810 a, b also includes network adapters or interfaces 836 such as a TCP/IP adapter cards, wireless Wi-Fi interface cards, or 3G or 4G wireless interface cards or other wired or wireless communication links. The object compression program 108A (FIG. 1) and software program 114 (FIG. 1) in client computer 102 (FIG. 1), and the object compression program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the object compression program 108A (FIG. 1) and software program 114 (FIG. 1) in client computer 102 (FIG. 1) and the object compression program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 910 a, b can include a computer display monitor 920, a keyboard 930, and a computer mouse 934. External components 910 a, b can also include touch screens, virtual keyboards, touch pads, pointing devices, and other human interface devices.

Each of the sets of internal components 810 a, b also includes device drivers 840 to interface to computer display monitor 920, keyboard 930, and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
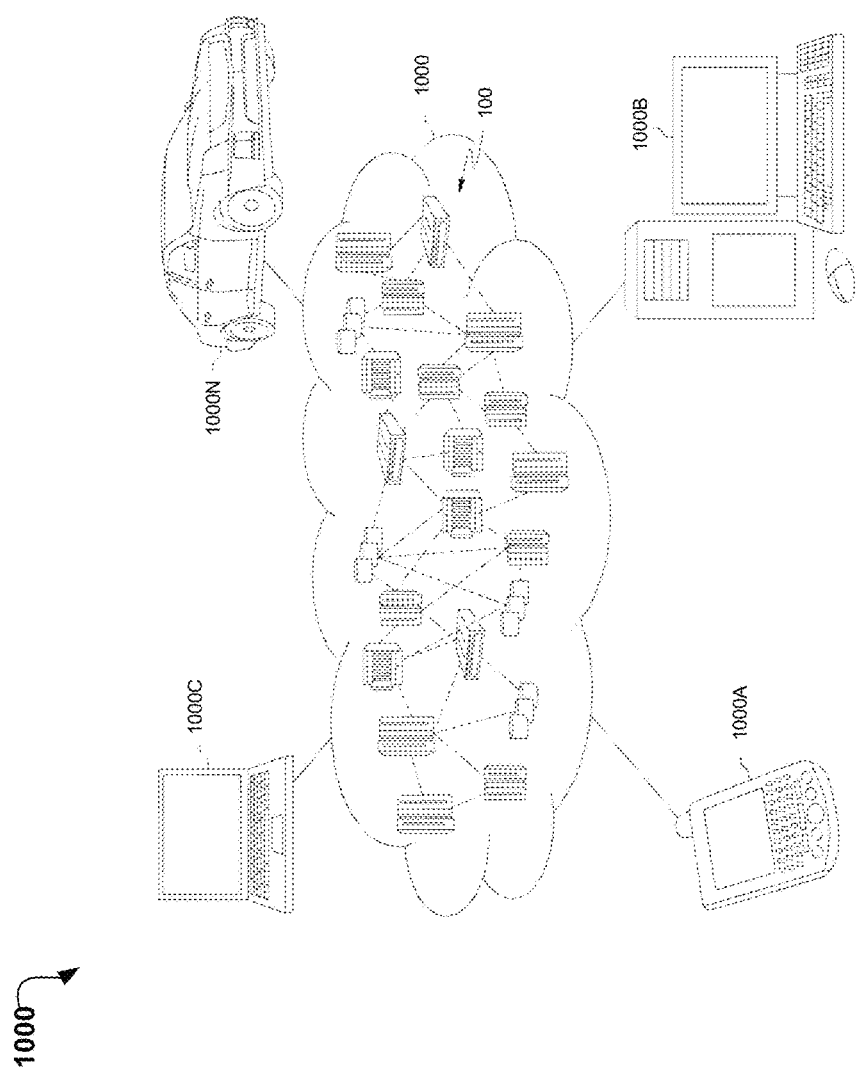
FIG. 9 is a block diagram of an illustrative cloud computing environment including the computer system depicted in FIG. 1, in accordance with an embodiment of the present disclosure.

Referring now to FIG. 9, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 9 are intended to be illustrative only and that computing nodes 100 and cloud computing environment 1000 can communicate with any type of computerized device over any type of network and/or network addressable connection (e.g., using a web browser).

Figure 10:
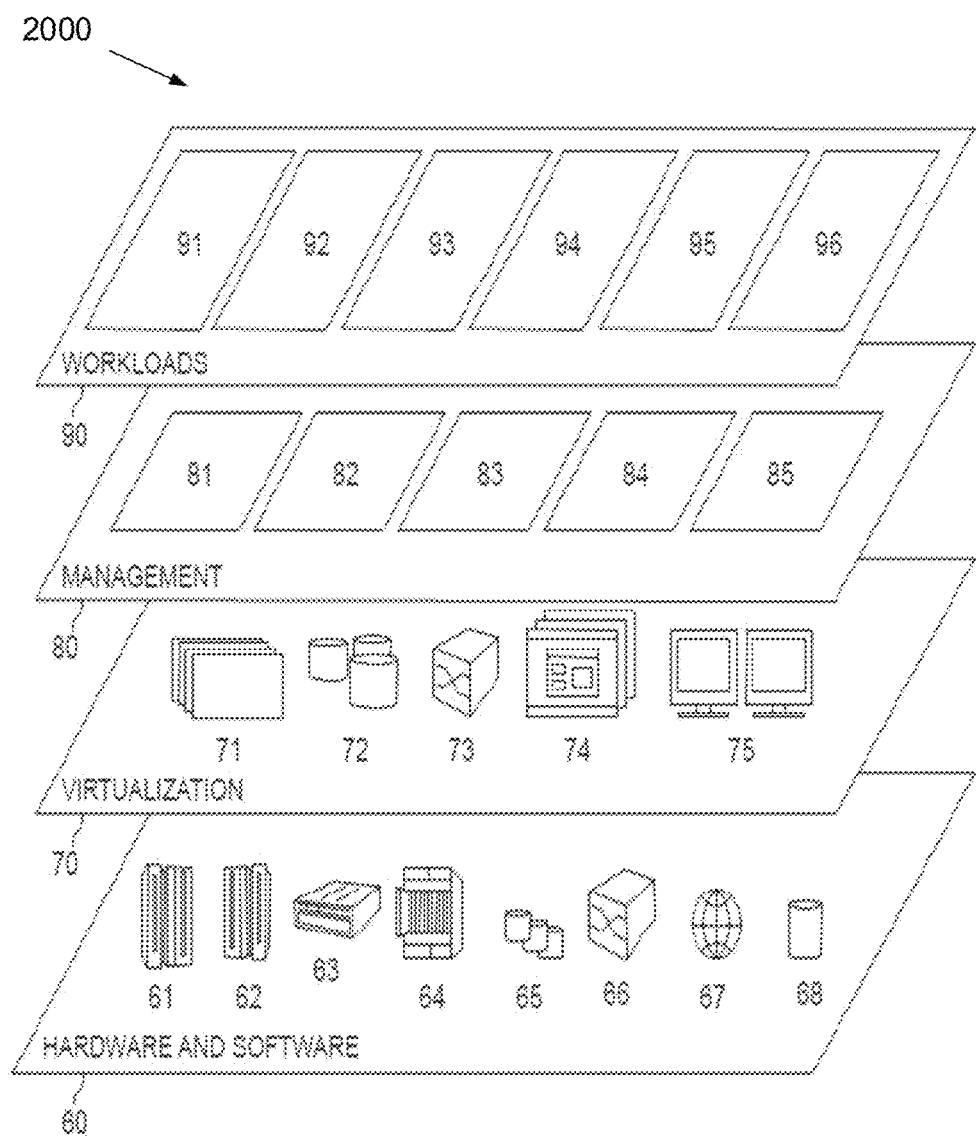
FIG. 10 is a block diagram of functional layers of the illustrative cloud computing environment of FIG. 9, in accordance with an embodiment of the present disclosure.

Referring now to FIG. 10, a set of functional abstraction layers 2000 provided by cloud computing environment 1000 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and object compression 96. An object compression program 108A, 108B (FIG. 1) may be offered "as a service in the cloud" (i.e., Software as a Service (SaaS)) for applications running on mobile devices 102 (FIG. 1) and may enable applications to compress and un-compress selected objects based on defined and customized rules.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for enabling at least one application to compress and un-compress a plurality of selected objects based on a plurality of defined customized rules, the method comprising:

generating a plurality of un-compressed objects and a plurality of proxy objects based on the plurality of selected objects, and storing the generated plurality of un-compressed objects on an un-compressed objects storage associated with the at least one application;
receiving the plurality of defined customized rules to determine when to compress the received and stored plurality of un-compressed objects;
compressing the stored plurality of un-compressed objects based on the received plurality of defined customized rules to generate a plurality of compressed objects, wherein compressing the stored plurality of un-compressed objects comprises serializing the stored plurality of un-compressed objects into a plurality of byte arrays, compressing the plurality of byte arrays associated with the serialized plurality of un-compressed objects, generating the plurality of compressed objects based on the compressed plurality of byte arrays, removing the stored plurality of un-compressed objects associated with the generated plurality of compressed objects from the un-compressed object storage, and updating a plurality of information associated with the generated plurality of compressed objects on an object info map.

2. The method of claim 1, wherein generating the plurality of un-compressed objects further comprises:
enabling an object proxy generator to receive requests from the at least one application to generate the plurality of un-compressed objects based on the plurality of selected objects;
generating the plurality un-compressed objects;
extracting a plurality of object interfaces associated with the plurality of selected objects;
generating the plurality of proxy objects; and
storing the plurality of proxy objects and a plurality of un-compressed object information on the object info map.

3. The method of claim 1, wherein receiving the plurality of defined customized rules further comprises:
receiving the plurality of defined customized rules on a rules engine, wherein the plurality of defined customized rules comprises at least one of a runtime rule wherein the plurality of un-compressed objects are compressed based on a defined time, a status rule wherein the plurality of un-compressed objects are compressed based on a compression status, and a session rule wherein the plurality of un-compressed objects associated with a session are compressed based on a defined session time.

4. The method of claim 1, wherein the at least one application comprises at least one of an email application and a web browser application.

5. A computer system for enabling at least one application to compress and un-compress a plurality of selected objects based on a plurality of defined customized rules, comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
generating a plurality of un-compressed objects and a plurality of proxy objects based on the plurality of selected objects, and storing the generated plurality of un-compressed objects on an un-compressed objects storage associated with the at least one application;
receiving the plurality of defined customized rules to determine when to compress the received and stored plurality of un-compressed objects;
compressing the stored plurality of un-compressed objects based on the received plurality of defined customized rules to generate a plurality of compressed objects, wherein compressing the stored plurality of un-compressed objects comprises serializing the stored plurality of un-compressed objects into a plurality of byte arrays, compressing the plurality of byte arrays associated with the serialized plurality of un-compressed objects, generating the plurality of compressed objects based on the compressed plurality of byte arrays, removing the stored plurality of un-compressed objects associated with the generated plurality of compressed objects from the un-compressed object storage, and updating a plurality of information associated with the generated plurality of compressed objects on an object info map.

6. The computer system of claim 5, wherein generating the plurality of un-compressed objects further comprises:
enabling an object proxy generator to receive requests from the at least one application to generate the plurality of un-compressed objects based on the plurality of selected objects;
generating the plurality un-compressed objects;
extracting a plurality of object interfaces associated with the plurality of selected objects;
generating the plurality of proxy objects; and
storing the plurality of proxy objects and a plurality of un-compressed object information on the object info map.

7. The computer system of claim 5, wherein receiving the plurality of defined customized rules further comprises:
receiving the plurality of defined customized rules on a rules engine, wherein the plurality of defined customized rules comprises at least one of a runtime rule wherein the plurality of un-compressed objects are compressed based on a defined time, a status rule wherein the plurality of un-compressed objects are compressed based on a compression status, and a session rule wherein the plurality of un-compressed objects associated with a session are compressed based on a defined session time.

8. The computer system of claim 5, wherein the at least one application comprises at least one of an email application and a web browser application.

9. A computer program product for enabling at least one application to compress and un-compress a plurality of selected objects based on a plurality of defined customized rules, comprising:
one or more computer-readable storage devices and program instructions stored on at least one of the one or more tangible storage devices, the program instructions executable by a processor, the program instructions comprising:
program instructions to generate a plurality of un-compressed objects and a plurality of proxy objects based on the plurality of selected objects, and program instructions to store the generated plurality of un-compressed objects on an un-compressed objects storage associated with the at least one application;
program instructions to receive the plurality of defined customized rules to determine when to compress the received and stored plurality of un-compressed objects;
program instructions to compress the stored plurality of un-compressed objects based on the received plurality of defined customized rules to generate a plurality of compressed objects, wherein the program instructions to compress the stored plurality of un-compressed objects comprises program instructions to serialize the stored plurality of un-compressed objects into a plurality of byte arrays, program instructions to compress the plurality of byte arrays associated with the serialized plurality of un-compressed objects, program instructions to generate the plurality of compressed objects based on the compressed plurality of byte arrays, program instructions to remove the stored plurality of un-compressed objects associated with the generated plurality of compressed objects from the un-compressed object storage, and program instructions to update a plurality of information associated with the generated plurality of compressed objects on an object info map.

10. The computer program product of claim 9, wherein the program instructions to generate the plurality of un-compressed objects further comprises:

program instructions to enable an object proxy generator to receive requests from the at least one application to generate the plurality of un-compressed objects based on the plurality of selected objects;

program instructions to generate the plurality un-compressed objects;

program instructions to extract a plurality of object interfaces associated with the plurality of selected objects;

program instructions to generate the plurality of proxy objects; and program instructions to store the plurality of proxy objects and a plurality of un-compressed object information on the object info map.

11. The computer program product of claim 9, wherein the program instructions to receive the plurality of defined customized rules further comprises:

program instructions to receive the plurality of defined customized rules on a rules engine, wherein the plurality of defined customized rules comprises at least one of a runtime rule wherein the plurality of un-compressed objects are compressed based on a defined time, a status rule wherein the plurality of un-compressed objects are compressed based on a compression status, and a session rule wherein the plurality of un-compressed objects associated with a session are compressed based on a defined session time.

* * * * *